(12) United States Patent
Dugan et al.

(10) Patent No.: US 10,099,893 B2
(45) Date of Patent: Oct. 16, 2018

(54) HOISTWAY COMMUNICATION SYSTEM

(71) Applicants: THYSSENKRUPP ELEVATOR AG, Essen (DE); THYSSENKRUPP AG, Essen (DE)

(72) Inventors: Michael W. Dugan, Germantown, TN (US); Christopher A. Taylor, Byhalia, MS (US)

(73) Assignee: THYSSENKRUPP ELEVATOR AG, Essen (DE)

( * ) Notice: Subject to any disclaimer, the term of this patent is extended or adjusted under 35 U.S.C. 154(b) by 265 days.

(21) Appl. No.: 14/860,315

(22) Filed: Sep. 21, 2015

(65) Prior Publication Data

US 2017/0081149 A1   Mar. 23, 2017

(51) Int. Cl.
| | |
|---|---|
| *B66B 1/34* | (2006.01) |
| *H04L 12/911* | (2013.01) |
| *H04L 12/26* | (2006.01) |
| *H04L 12/417* | (2006.01) |

(52) U.S. Cl.
CPC .......... *B66B 1/3453* (2013.01); *H04L 12/417* (2013.01); *H04L 43/50* (2013.01); *H04L 47/70* (2013.01)

(58) Field of Classification Search
CPC ............................ H04L 43/0876; H04L 67/12
USPC ........................................................ 709/224
See application file for complete search history.

(56) References Cited

U.S. PATENT DOCUMENTS

| | | | | | |
|---|---|---|---|---|---|
| 4,918,690 | A | * | 4/1990 | Markkula, Jr. .... | G05B 19/0421 340/9.11 |
| 5,024,295 | A | * | 6/1991 | Thangavelu .......... | B66B 1/2458 187/382 |
| 5,360,952 | A | * | 11/1994 | Brajczewski ............. | B66B 1/34 187/248 |
| 5,422,885 | A | | 6/1995 | Nadkarni | |
| 5,844,893 | A | * | 12/1998 | Gollnick ................. | G08C 17/02 370/328 |
| 6,157,952 | A | | 12/2000 | Geiszler et al. | |
| 8,915,334 | B2 | * | 12/2014 | Finschi ................. | B66B 1/2408 187/249 |
| 2012/0296451 | A1 | * | 11/2012 | Kaps ...................... | H04L 12/282 700/83 |
| 2013/0265009 | A1 | | 10/2013 | Janz et al. | |
| 2016/0248498 | A1 | * | 8/2016 | Mottahedin ............ | H04B 10/40 |
| 2017/0111085 | A1 | * | 4/2017 | Pera ......................... | H04B 3/54 |

OTHER PUBLICATIONS

PCT Application No. PCT/EP2016/072154, International Search Report and Written Opinion, dated Dec. 20, 2016, 13 pages.

* cited by examiner

*Primary Examiner* — Frantz Coby
(74) *Attorney, Agent, or Firm* — Lathrop Gage L.L.P.

(57) ABSTRACT

A communication system includes a host node and a plurality of network nodes. The host node has a processor, a non-transitory computer memory, a host receiver, and a host output select line. Each of the plurality of network nodes has an input select line, an output select line, and a tri-state transceiver. The host node and the plurality of network nodes are daisy chained such that the input select line of one of the plurality of network nodes is coupled to the output select line of the preceding node. The tri-state transceiver of each of the plurality of network nodes is activated when the input select line of that node receives a token from the output select line of the preceding node.

17 Claims, 8 Drawing Sheets

US 10,099,893 B2

HOISTWAY COMMUNICATION SYSTEM

FIELD OF THE INVENTION

The invention relates generally to the field of communication systems. More specifically, the invention relates to a communication system for an elevator hoistway.

SUMMARY

Hoistway communication systems and methods for making and using the same are disclosed herein. According to one embodiment, a communication system for an elevator hoistway comprises a host node having a processor, a non-transitory computer memory, a host receiver, and a host output select line. The communication system includes a first network node having a first input select line, a first output select line, and a first tri-state transceiver. The communication system also includes a second network node having a second input select line, a second output select line, and a second tri-state transceiver. The first network node is coupled to the host node in series via the first input select line and the host output select line. The second node is coupled to the first node in series via the second input select line and the first output select line. The first tri-state transceiver is enabled when the first input select line is activated to receive a token from the host output select line. The first network node transmits data to the host receiver upon receipt of the token. The second tri-state transceiver is enabled when the second input select line is activated to receive the token from the first output select line.

According to another embodiment, a method for making a communication system for an elevator hoistway comprises the step of providing a host node having a host output select line and a host receiver. The method further comprises the step of providing a plurality of network nodes in the elevator hoistway. Each network node has an input select line, an output select line, and a tri-state transceiver. The method includes the step of daisy chaining the host node and the plurality of network nodes. The method also includes the step of causing the tri-state transceiver of one of the plurality of network nodes to be enabled when the input select line of that network node is activated by the output select line of the preceding node.

According to yet another embodiment, a communication system comprises a host node and a plurality of network nodes. The host node has a processor, a non-transitory computer memory, a host receiver, and a host output select line. Each of the plurality of network nodes has an input select line, an output select line, and a tri-state transceiver. The host node and the plurality of network nodes are daisy chained such that the input select line of one of the plurality of network nodes is coupled to the output select line of the preceding node. The tri-state transceiver of each of the plurality of network nodes is activated when the input select line of that node receives a token from the output select line of the preceding node.

BRIEF DESCRIPTION OF THE SEVERAL VIEWS OF THE DRAWINGS

Illustrative embodiments of the present invention are described in detail below with reference to the attached drawing figures and wherein.

DETAILED DESCRIPTION

Figure 1:
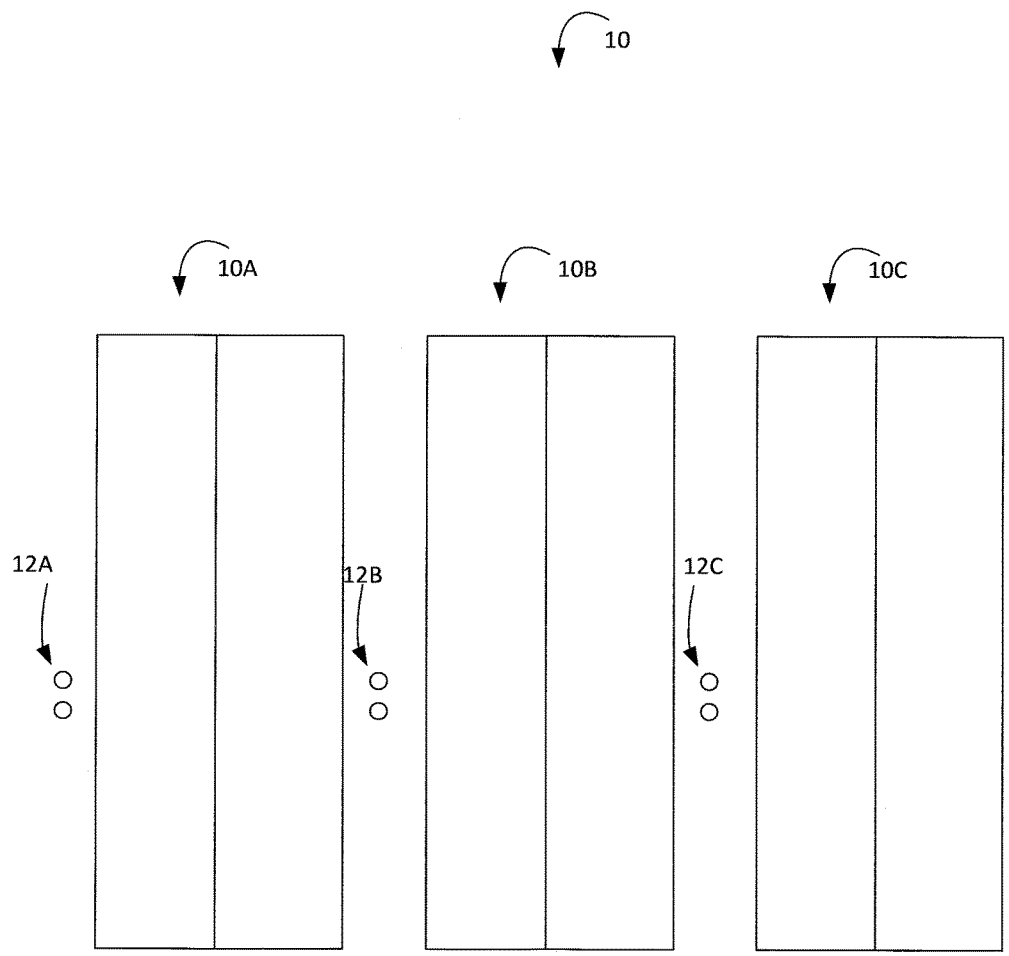
FIG. 1 is a front view of a prior art elevator bank.

Elevators are a ubiquitous aspect of modern life. Generally, elevators propel an elevator cab vertically to assist moving passengers and/or cargo between the floors of a multi-floor building. In larger buildings, banks of elevators may be used to move people and/or cargo more efficiently. The typical elevator cab is constructed as a small box, with sliding doors that allow passengers to enter and exit the elevator. FIG. 1 shows a front view of a typical elevator bank 10 having elevators 10A, 10B, and 10C. As is known, a passenger may press an elevator call button, such as elevator call buttons 12A, 12B, and 12C, to call an elevator to the desired floor.

Figure 2:
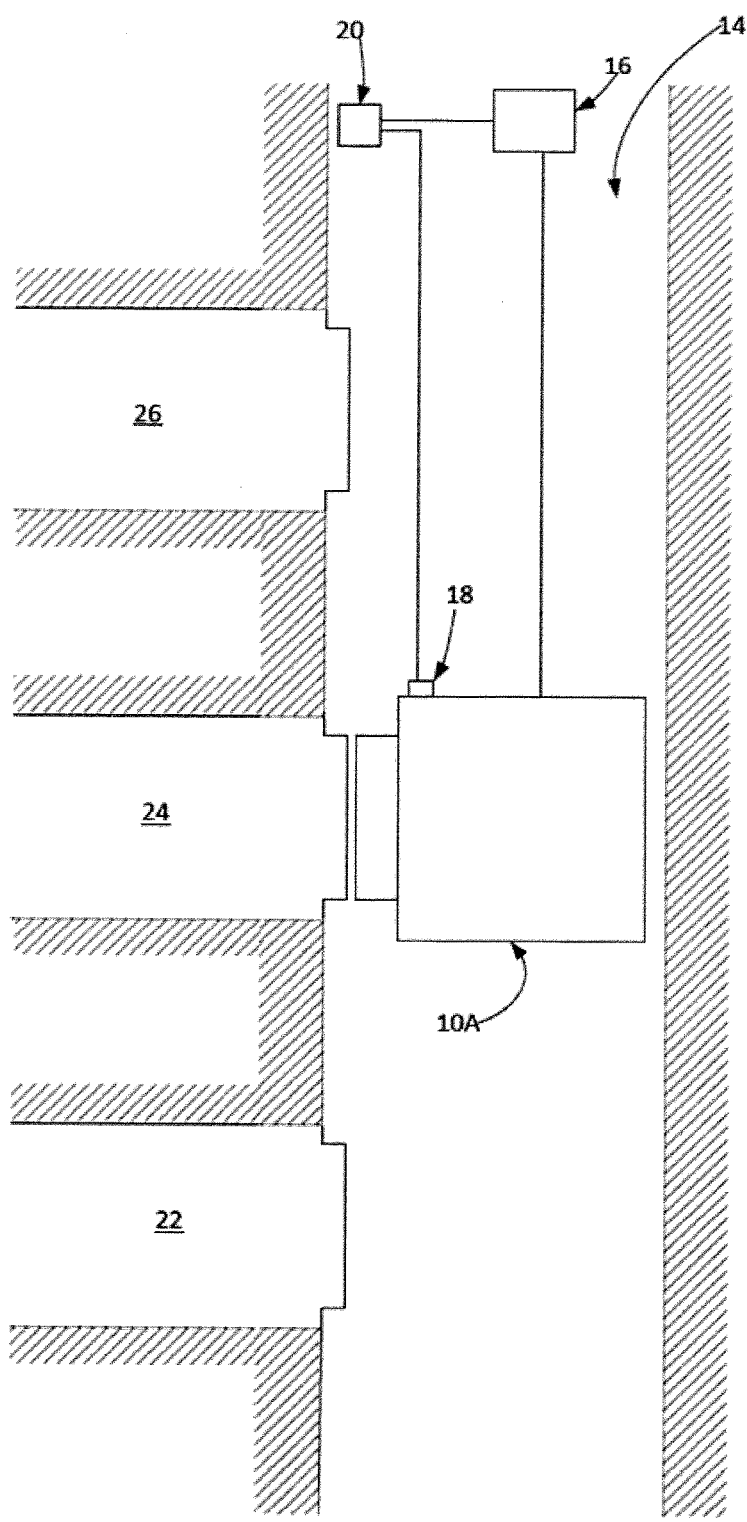
FIG. 2 is a cross sectional view of an elevator hoistway as is known in the prior art.

FIG. 2 shows an elevator hoistway 14 for the elevator 10A. The elevator 10A may be coupled to a driving mechanism 16 and have an elevator cab control unit 18 in electronic communication with an elevator control unit 20. The elevator control unit 20 may have a processor and non-transitory memory comprising programming instructions for controlling the operation of the elevator 10A. For example, the elevator control unit 20 may cause the elevator 10A to stop at a desired position in the hoistway 14 (e.g., stop at a desired floor such as one of the floors 22, 24, and 26 of the multi-story building) and cause the elevator doors to open so that passengers may enter and exit the elevator. Each of the elevators 10A-10C may be in communication with the elevator control unit 20, or alternatively, each elevator 10A-10C may have its own elevator control unit 20 that may be situated within or close to the elevator's hoistway.

Figure 3:
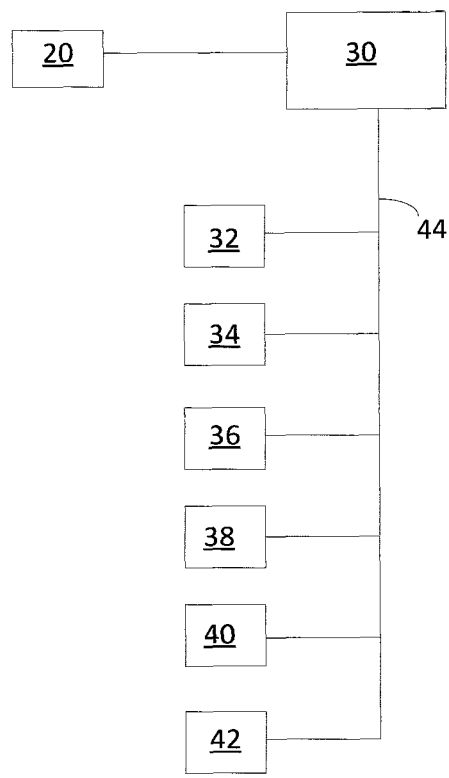
FIG. 3 is a schematic illustration of a prior art hoistway communication system.

The elevator control unit 20 may be in data communication with a host node 30 (shown in FIG. 3), which may in-turn be communicatively coupled to several nodes within the hoistway 14 (e.g., via one or more high speed communication links). For instance, as shown in FIG. 3, the host node 30 may be in data communication with nodes 32, 34, 36, 38, 40, and 42 over a communication link 44. As is known, each node 32-42 may interface with one or more sensors, switches, or other input and output devices associated with the elevator 10A. While FIG. 3 shows six nodes 32-42 in data communication with the host node 30, the skilled artisan will appreciate that in many elevator systems, the host node 30 may be in data communication with a large number of nodes (e.g., 100 nodes, 200 nodes, 300 nodes, et cetera). Further, the distance between certain nodes and the host node 30 may be significant. The large number of nodes and the long distances between certain nodes and the host node 30 may make the effectuation of data communication between the host node 30 and the other nodes over a communication link that extends from the host node 30 to a multitude of nodes infeasible, particularly considering the fast response times that are required in elevator control systems. The present invention eliminates the need for a high speed communication link from the host node 30 to a multitude of nodes.

Figure 4:
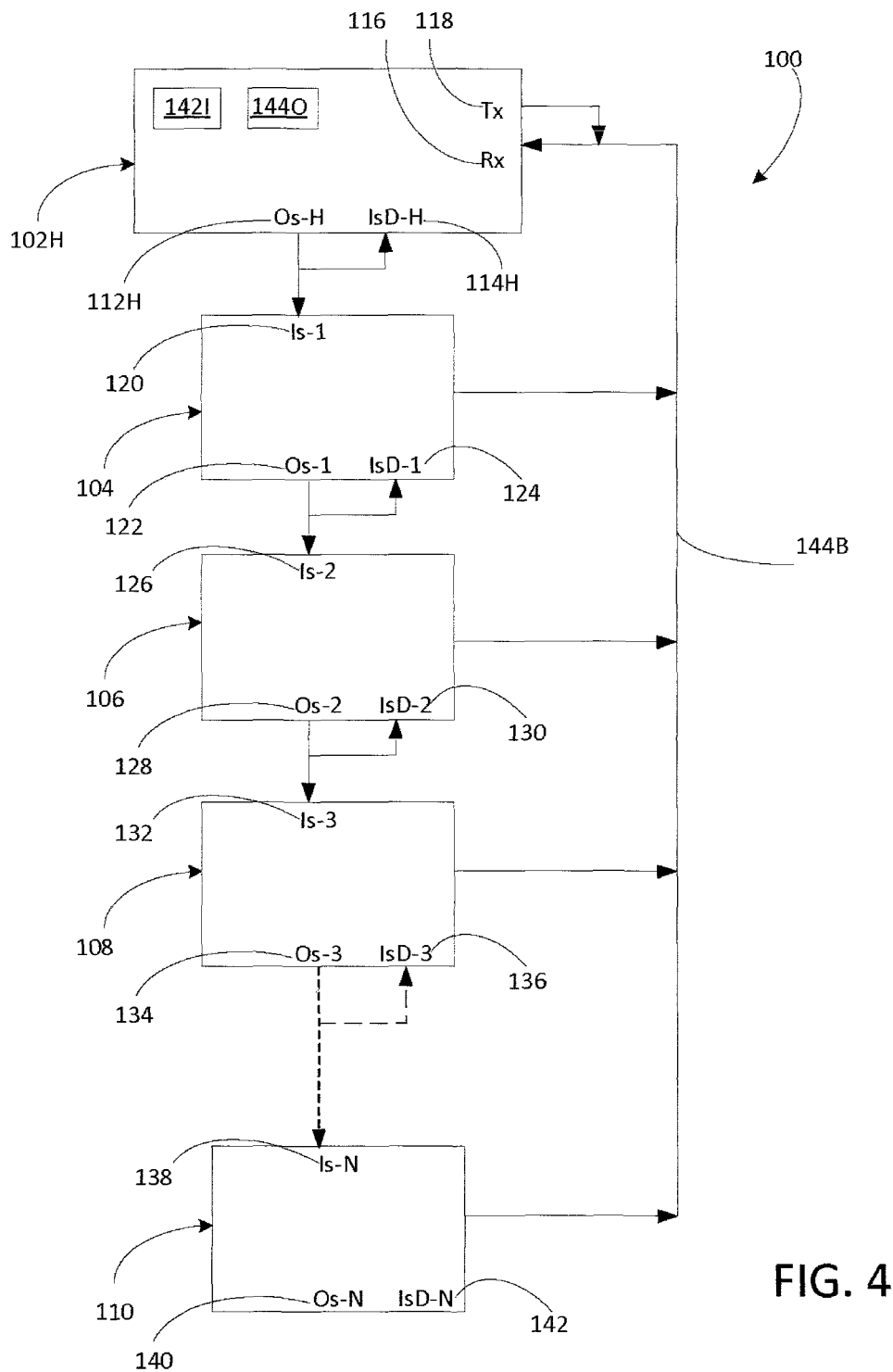
FIG. 4 is a schematic illustration of a hoistway communication system, according to an embodiment.

FIG. 4 shows the topology of an embodiment 100 of a communication system for a hoistway. The communication system 100 may comprise a host node 102H and a plurality of network nodes, such as nodes 104, 106, 108, and 110. The network nodes 104, 106, 108, and 110 may also be referred to herein as the first node, the second node, the third node, and the nth node, respectively. The nth node may be the terminal node in the series, and the letter n signifies that any number of nodes may likewise be provided.

The host node 102H may have an output select line (or "Os-H") 112H, a diagnostic input line (or "IsD-H") 114H, a receiver 116, and a transmitter 118. The first node 104 may have an input select line (or "Is-1") 120, an output select line (or "Os-1") 122, and a diagnostic input line (or "IsD-1") 124. The second node 106 may have an input select line (or "Is-2") 126, an output select line (or "Os-2") 128, and a diagnostic input line (or "IsD-2") 130. The third node 108, akin to the first node 104 and the second node 106, may have an input select line (or "Is-3") 132, an output select line (or "Os-3") 134, and a diagnostic input line (or "IsD-3") 136. The nth node 110 may likewise have an input select line (or "Is-N") 138, an output select line (or "Os-N") 140, and a diagnostic input line (or "IsD-N") 142.

The host node 102H, and the nodes 104-110, may be daisy chained. That is, the host node 102H, and the network nodes 104-110, may be connected in series one after another. As can be seen in FIG. 4, the host node 102H and the first node 104 may be coupled to each other in series via the output select line (Os-H) 112H of the host node 102H and the input select line (Is-1) 120 of the first node 104. Similarly, the first node 104 may be coupled to the second node 106 in series via the output select line (Os-1) 122 of the first node 104 and the input select line (Is-2) 126 of the second node 106. The second node 106 may be coupled to the third node 108 in series via the output select line (Os-2) 128 of the second node 106 and the input select line (Is-3) 132 of the third node 108. And, the n-1 node (not expressly shown) may be coupled to the nth node 110 in the same way.

In some embodiments, the diagnostic input line (IsD-X) may be coupled to the output select line (Os-X) of that node. Specifically, as is shown in FIG. 4, the Os-H line 112H of the host node 102 may be coupled to the diagnostic input line (IsD-H) 114H of the host node 102. Similarly, the Os-1 line 122 of the first node 104 may be coupled to the IsD-1 line 124 of the first node 104, the Os-2 line 128 of the second node 106 may be coupled to the IsD-2 line 130 of the second node 106, and so on.

A high speed bus 144B may be provided as a parallel bus topology from each node to the host node 102. Specifically, as can be seen, each network node 104-110 may be able to communicate data to the host node 102H over the high speed bus 144B, which data may be received by the receiver 116 of the host node 102H. The speed of the bus 144B may be chosen as appropriate. For example, when the number of nodes (i.e., n) is about 250, the bus speed may approach 1 MHz. However, the bus speed may be linearly reduced for applications where the number of nodes n is less than 250.

As explained in more detail herein, the daisy chained lines (e.g., the Os-H and the Is-1 lines; the Os-1 and the Is-2 lines; the Os-2 and the Is-3 lines, et cetera) may be used as a trigger for the transmission of data and for the enabling of the bus 144B. In some embodiments, an electric repeater (e.g., an RS-485 electric repeater) may be provided in the bus 144B that amplifies the signal, reduces the effective load, and provides node isolation from the bus 144B for improved diagnostics.

Figure 5:
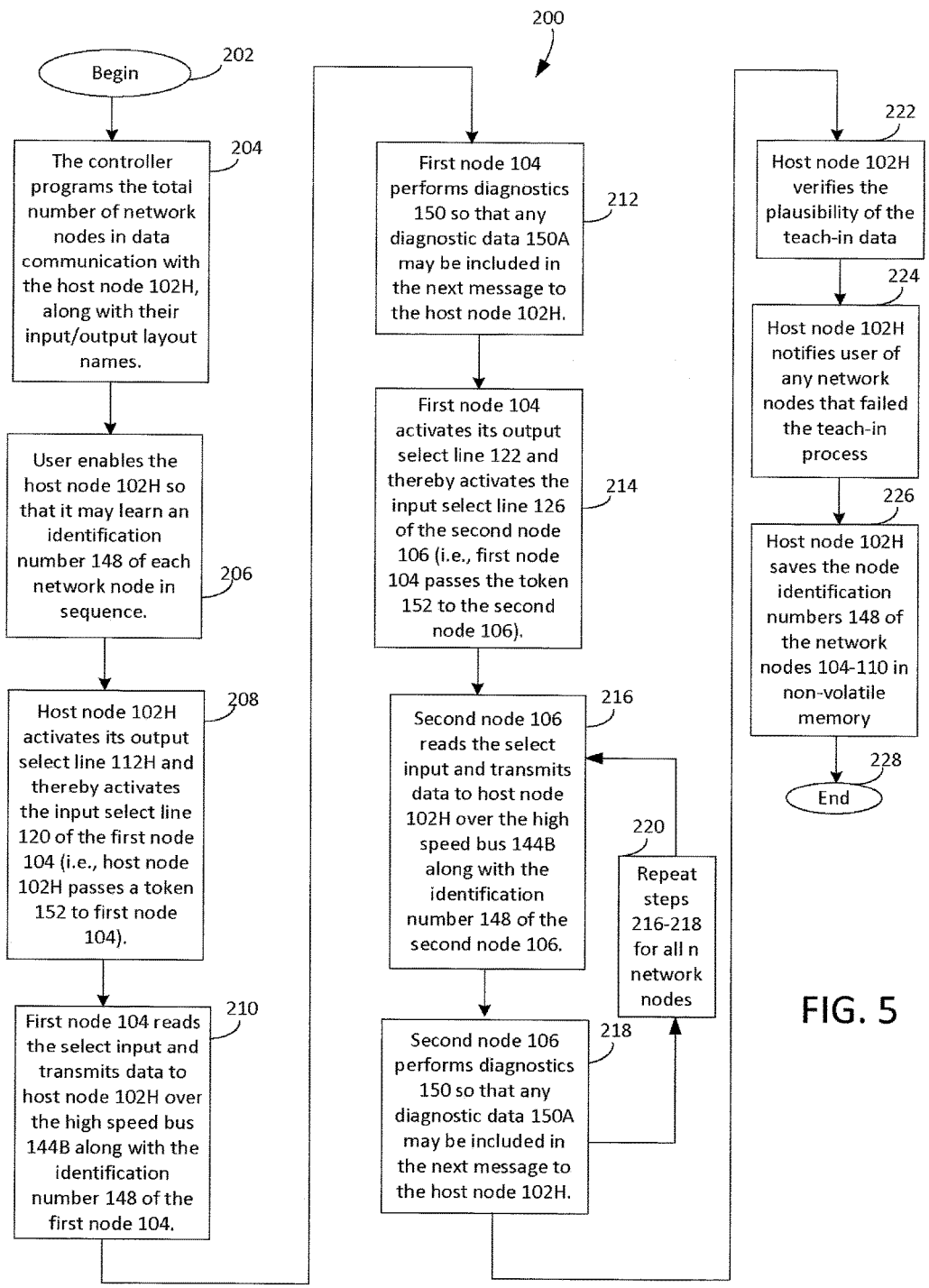
FIG. 5 is a flow chart illustrating a method for using the hoistway communication system of FIG. 4.

Prior to use of the system 100 for normal operation, it may be desirable in some embodiments to employ a "teach-in" procedure to test the system 100 and to provide the host node 102H with pertinent information about the network nodes 104-110. FIG. 5 illustrates a method 200 for effectuating the teach-in process. The method 200 may begin at step 202. At step 204, the controller (e.g., of the elevator control unit 20 or of the host node 102) may program the total number of network nodes that are in data communication with the host node 102H along with their input/output layout names.

The host node 102H may have an input device 142I and may have an output device 144O (see FIG. 4). The input device 142I may be any device that allows data to be fed to the host node 102H (e.g., to a non-transitory memory or a processor thereof (not expressly shown)), such as a keyboard, a mouse, an fingerprint or IRIS scanner, a button, a switch, a terminal or other connection point that may be enabled by a jumper, et cetera. The output device 144O may similarly be any device that allows the host node 102H to output data, such as one or more LEDs, a touch screen or other display, an alarm, et cetera. At step 206, a user may enable the host node 102H using the input device 142I so that the host node 102H can learn an identification number 148 of each network node 104-110 in sequence.

At step 208, the host node 102H may activate its output select line 112H (Os-H) and thereby activate the input select line (Is-1) 120 of the first node 104 that is daisy chained to the host node 102H. That is, at step 208, the host node 102H may pass a token 152 to the first node 104.

At step 210, as its Is-1 line 120 is activated, the first node 104 may read the select input and may transmit all the data, with the identification number 148 of the first node 104, to the host node via the high speed bus 144B.

At step 212, after the transmission to the host node 102H has been effectuated, the first node 104 may perform diagnostics 150 so that any diagnostic data 150A may be included in the next data message to the host node 102H. The diagnostic data 150A may for example indicate that all required data was not properly transmitted to the host node 102H (e.g., the diagnostics 150 may include testing for a stuck input, et cetera).

At step 214, the first node 104 may activate its output select line (Os-1) 122, thereby activating the input select line (Is-2) of the second node 106 that is daisy chained to the first node 104. That is, the first node 104 may pass the token 152 to the second node 106. At step 216, the second node 106 may read the select input and may transmit data to the host node 102H over the high speed bus 144B, along with the identification number 148 of the second node 106. Then, at step 218, akin to step 212, the second node 106 may perform the diagnostics 150 so that the diagnostic data 150A may be included in the next message to the host node 102H.

At step 220, the steps 216-218 may be repeated until each network node has received the token 152 from the preceding network node in the series and transmitted its data back to the host node 102H over the bus 144B. For example, the second node 106 may activate its output select line (Os-2) 128 thereby activating the input select line (Is-3) 132 of the third node 106, and the third node 106, which now has the token 152, may transmit its data to the host node 102H over the bus 144B and then perform the diagnostics 150 thereafter.

Once step 220 has been performed, the host node 102H, at step 222, may verify the plausibility of the teach-in data (e.g., determine whether any nodes failed the teach-in process). At step 224, the host node 102H may notify the user (e.g., via the output device 144O) of any network nodes that failed the teach-in (e.g., were non-responsive), so that the user may focus his attention to those nodes. At step 226, the host node 102H may save in its non-volatile memory the sequential node identification numbers 148 it learned during the teach-in process. The method 200 may then end at step 228.

Once the teach-in process 200 has ended, the system 100 may operate automatically. The normal operation of the communication system 100 may be identical to the teach-in process 200 described above, except that the node identification numbers 148 may already exist in the non-volatile memory of the host node 102H.

In some embodiments, the output select lines (Os-x) of the host node 102H and the network nodes 104-110 may also be looped back as inputs to that node so that the outputs may be monitored. For example, as shown in FIG. 4, the Os-H line 112H may be coupled to the diagnostic input line (IsD-H) 114H, the Os-1 line may be coupled to the diagnostic input line (IsD-1) 124, and so on, so that the respective outputs at the host node 102H and the network nodes 104-110 may be monitored. Similarly, the receiver line 116 may be coupled to the transmitter line 118 to allow for monitoring of the receiver line 118. The host node 102H may have as part of its input device 142I a button or switch for example that the user may use to initiate the loopback diagnostic tests at any time.

The communication system 100 as described herein may provide several benefits over traditional communication systems employed in hoistways. For example, the topology 100 eliminates the need for a high speed current loop data transmission line, the speed of which must generally be reduced at increasing distances. Further, an electric repeater (e.g., an RS-485 electric repeater) may conveniently be added as required as a function of length and node number, without adding network delay. The repeater may eliminate long runs of cable and large node counts as potential electrical problems. Moreover, where the node identification number 148 is chosen to include more than eight bits (e.g., 10 bits), more than 255 nodes may easily be incorporated into the communication system 100. Further, because the select input and output lines (i.e., Os-X and Is-X) are daisy chained from node to node, the resulting communication between the nodes may be highly reliable and easily accessible. Additionally, the communication system 100 may make identification of network problems easier as the parallel serial bus is isolated between the network nodes 104-110. And, the scheme 100 may eliminate the need to manually identify nodes and inputs by utilizing the daisy chain method to identify nodes, and therefore provide a plug and play scheme.

The system 100 may be designed so that all network nodes 104-110 report the switch input data and the test data to the host node 102H over the bus 144B within a cycle time. For instance, where there are 50 bits of data with 250 nodes and the bus speed is around 1 Mhz, the cycle time may be around 13 milliseconds. In some embodiments, a safety cycle time (i.e., the time within which the system 100 may enter a diagnostic or a "safe mode") may be set as a multiple of the cycle time. For example, the safety cycle time may be set to be between three and eight times the cycle time (e.g., between 38 milliseconds and 104 milliseconds). Setting the safety cycle time as a multiple of the cycle time may desirably ensure that the communication system 100 is not interrupted unnecessarily (e.g., because of insubstantial noise). The system 100 may detect a swapped node within this safety cycle time. The system 100 may also determine that a new network node has been inserted into the system 100 within this safety cycle time. Similarly, the system 100 may detect a stuck input (or diagnose any other such error within the communication system 100) within the safety cycle time, and upon such a diagnosis, enter the safe mode so that the diagnosed problem may be rectified.

During normal operation, the system 100, and specifically the host node 102H, may check the integrity of the data that is communicated to it by the network nodes 104-110. This data integrity checking may comprise one or more of several steps. For example, the host node 102H may ensure that all node identification numbers 148 are received by it sequentially in the order it learned during the teach-in process 200 (as saved in the non-volatile memory). The host node 102H may ensure that all the network nodes 104-110 that are currently part of the system 100 properly responded to the host node 102H. Further, the host node 102H may validate the message data. For instance, the host node may implement cyclic redundancy checks and check the sequence number and node identification numbers 148 of the network nodes 104-110 each time it receives a data message. The host node 102H may also ensure that the message round trip time is within the specification for each node transmitting the message, and is within the specification for all nodes 104-110. For example, the message round trip time may be 20 milliseconds or less, and the host node 102H may apprise the user if the message is not received within this time. Hence, the host node 102H may evaluate the deterministic response of the node data in both time response and order of node response.

Thus as has been described, the present invention eliminates the problems associated with high speed data transmission over relatively long distances to many nodes by using a combination of discrete input/output token passing as a data trigger, and a high speed bus 144B with an optional repeater for data transmission and line isolation. The communication system 100 renders it unnecessary to employ a high speed communication link from the host note 102H to a multitude of network nodes by using a discrete token passing input/output that is daisy chained from node to node. The topology 100 described herein may improve data transfer reliability, increase the number of nodes that can be employed, reduce the response time for inputs, reduce the time it takes to detect a faulty node, and provide for a plug and play installation, and therefore improve the performance and diagnostics of prior art hoistway communication systems.

Figure 6:
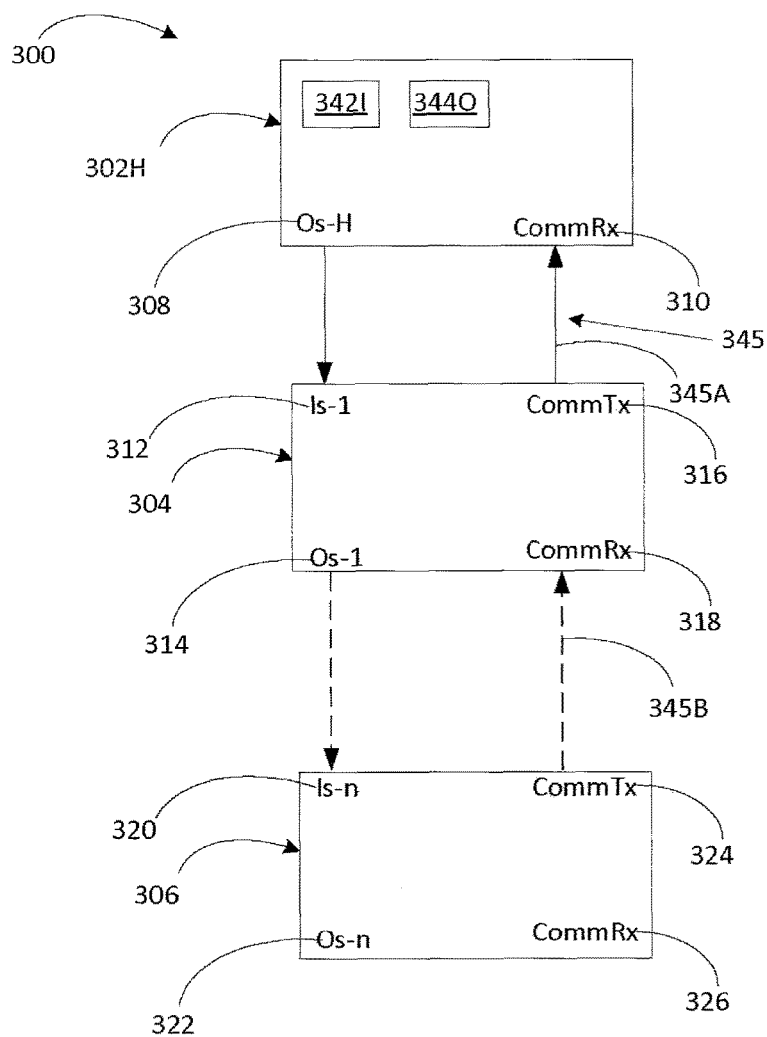
FIG. 6 is a schematic illustration of a hoistway communication system, according to another embodiment.

Attention is directed now to FIG. 6, which shows an alternate embodiment 300 of the communication system 100. The embodiment 300 may be similar to the embodiment 100, except as specifically noted and/or shown, or as would be inherent. Further, those skilled in the art will appreciate that the embodiment 300 (and the embodiment 100) may be modified in various ways, such as through incorporating all or part of any of the previously described embodiments, for example. For uniformity and brevity, corresponding reference numbers may be used to indicate corresponding parts, though with any noted deviations.

The communication system 300 may comprise a host node 302H, a first node 304, and an nth node 306. As with the embodiment 100, the nth node 306 signifies that any number of network nodes may be provided as set forth herein. The host node 302H may have an input device 342I and an output device 344O, which may be generally the same as the input and output devices 142O and 144O discussed above for the embodiment 100. The host node 302H may also have an output select line (Os-H) 308 and a communication receiver 310.

The first node 304 may have an input select line (Is-1) 312, an output select line (Os-1) 314, a communication transmitter 316, and a communication receiver 318. Each network node may similarly have an output select line (Os-X), and input select line (Is-x), and a communication transmitter and receiver. For example, as shown in FIG. 6, the nth network node 320 may have an input select line (Is-n) 320, an output select line (Os-n) 322, a transmitter 324, and a receiver 326.

Much like the embodiment 100, the host node 302H and the network nodes 304-306 may be daisy chained. That is, the host node 302H, and the network nodes 304-306, may be connected in series one after another. As can be seen in FIG. 6, the host node 302H and the first node 304 may be coupled to each other in series via the output select line (Os-H) 308 of the host node 302H and the input select line (Is-1) 312 of the first node 304. Similarly, the first node 304 may be coupled to the second node (i.e., the nth node in FIG. 6) via the output select line (Os-1) 314 of the first node 304 and the input select line (Is-n) 320 of the second node 306. Each network node may be wired to preceding node in the same way.

Further, instead of a parallel bus such as bus 144B of the communication system 100, a transmission line 345 may extend in series from the communication transmitter of each node to the communication receiver of the preceding node. For example, as shown in FIG. 6, a transmission line segment 345A may extend from the communication transmitter 316 of the first node 304 to the communication receiver 310 of the host node 302H. Similarly, a transmission line segment 345B may extend from the communication transmitter 324 of the nth node 306 to the communication receiver of the preceding (n-1, not expressly shown) node, and so on.

Figure 7:
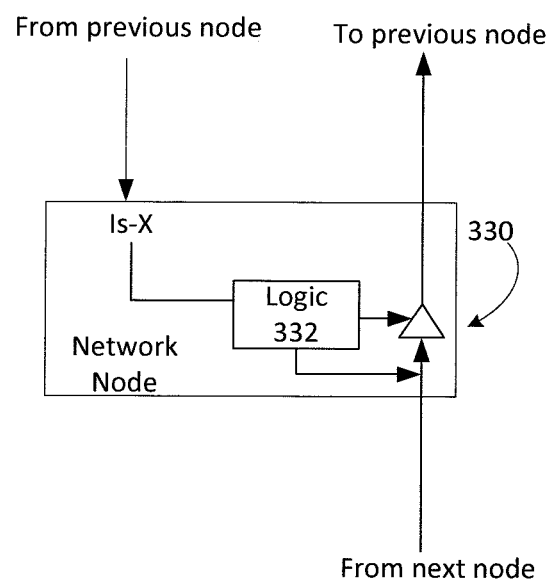
FIG. 7 is a schematic detailing a tri-state transceiver of a network node of the hoistway communication system of FIG. 6.

The communication transmitter and receiver of a network node (e.g., transmitter 316 and receiver 318 of the first node 304, the transmitter 324 and receiver 326 of the second node 306, et cetera) may also be collectively referred to herein as the transceiver (or repeater) 330. FIG. 7 schematically shows the transceiver 330. The transceiver 330 may be a high speed tri-state transceiver. In some embodiments, the transceiver 330 may be integral to the network node. In other embodiments, the transceiver 330 may be external and may only be employed when needed based on the baud rate and cable length. The transceiver 330 may be enabled when the input select line (Is-X) is active (i.e., Is-X=1), and may be tri-stated when the Is-X=0. All network nodes 304-306 that see Is-X=0 may turn off their respective output select lines (Os-X). In some embodiments, logic 332 may be added to the repeater 330. The logic 332 may protect against a faulty (e.g., a stuck) input select line (Is-X). The repeater 330 for the serial communication may prevent the signal from degrading and may allow for transmission of data over long distances at minimal cost.

In operation, as in the embodiment 100, the data transfer cycle may begin by the host node 302H activating its output select line (Os-H) 308 to provide an input to the first node 304 via the input select line (Is-1) of the first node 304. The first node 304 may detect that its input select line (Is-1) 312 is activated and may enter the data transfer cycle. When the input select line (Is-1) 312 of the first node 304 is active (i.e., Is-1=1), the first node 304 may activate its transceiver 330. The first node 304 may thus transmit all the data via the transceiver 330 (specifically, via its communication transmitter 316) to the host node 302H over the transmission line segment 345A, and the data may be received by the communication receiver 310 of the host node 302H. The first node 304 may then pass the token (e.g., the token 152) to the next node (i.e., node n in FIG. 6) via its output select line (Os-1) 314. That is, the first node 304 may activate its output select line (Os-1) 314 and thereby activate the input select line (Is-n) 320 of the nth node. The activation of the input select line (Is-n) 320 may activate the transceiver 330 of the nth node 306, which may send all the data via its communication transmitter 324 to the host node 302H via the first node 314 (e.g., over the transmission lines 345). When all network nodes 304-306 have reported their data, or when the line is idle, the host node 302H may exit the data transfer mode by deactivating the Os-H line 308.

As in the embodiment 100, loopback tests may be employed with the host node 302H to monitor the Os-H line 308 and the receiver line 310 (e.g., the Os-H line 308 may be looped back to the host node 302H via a diagnostic input line (not expressly shown), and a host transmitter (not expressly shown) may be used to feed data to the host communication receiver 310). Like the embodiment 100, the input device 342I of the host node 302H may comprise a test button that may be depressed to initiate the loopback tests. Alternatively, the loop back tests may be initiated by coupling certain terminals of the host node 302H with a jumper (not expressly shown). When a loop back test is initiated, the host node 302H may transmit a fixed message on the serial line (Os-H) 308. The host node 302H may relay the status of the loopback test to a user via a serial peripheral interface (SPI); alternatively, the output device 344O may include a status LED (or other indicator) which may convey the status of the test to the user. Further, each network node 304-306 may be provided with time out protection of its respective input select (Is-X) and output select (Os-X) lines to aid in the isolation of any faults that occur.

The skilled artisan will appreciate that the communication system 300 may allow any faults in the physical inputs and outputs, and any power supply failures in the serial network, to be conveniently detected and isolated. A common problem with a parallel bus system is that the isolation of any network node shorting the line is difficult, as to locate the source of a problem, the trouble shooting process typically involves disconnecting network nodes until the bus is free. In a hoistway, such as the hoistway 14, the process is particularly labor intensive. The communication system 300, by isolating each network node 304-306 by use of transceivers 300 and the logic 332 to protect against failed inputs, may mitigate this problem.

As with the embodiment 100, the system 300 may enter a safe mode upon the diagnosis of certain faults. For example, if the input select line (Is-X) or the output select line (Os-X) of a network node is active for longer than the safety cycle time, that network node 304-306 may inhibit its repeater 330. This may free the serial line and therefore allow the host node 302H to isolate the location of the fault. The system 300 may resume normal operation once the fault condition is cleared.

Figure 8:
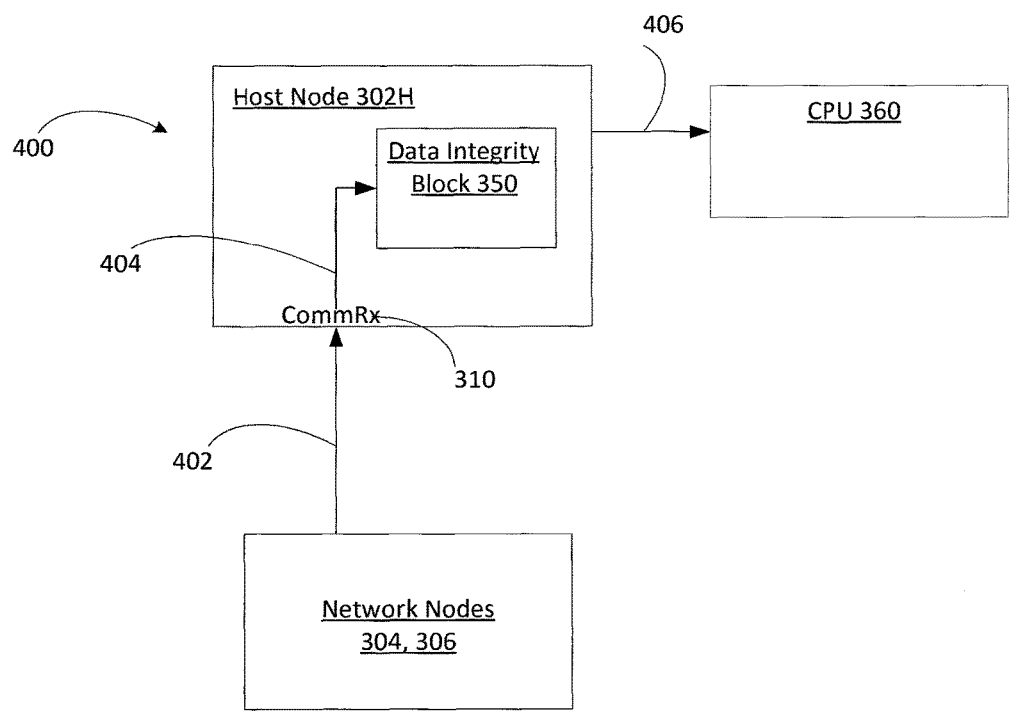
FIG. 8 is a schematic illustration of a method for checking integrity of the data received by a host node of the communication system of FIG. 6.

As noted, during normal operation, the communication system 100 may function as shown in FIG. 5, except that the node identification numbers (e.g., the node identification numbers 148) may already exist in the non-volatile memory of the host node 102H after the teach-in process 200 has been effectuated. The normal operation of the communication system 300 may similarly be generally identical to its teach-in process, except that the node identification numbers of the network nodes (e.g., the network nodes 304, 306, et cetera) may be saved in the non-volatile memory of the host node 302H by virtue of the teach-in process. In some embodiments, as shown in FIG. 8, the host node 302H may check the integrity of the data it receives from each network node (e.g., the network nodes 304, 306) before it conveys the state of this data to an elevator controller's central processing unit 360. Specifically, FIG. 8 shows a method 400 whereby the data communicated from the network nodes (e.g., nodes 304, 306) to the host node 302H at step 402 is first passed to a data integrity block 350 of the host node 302H before the host node 302H conveys the state of the data to the elevator's central processing unit 360.

The data integrity process block 350 of the host node 302H may ensure the integrity of all messages received by the host node 302H. The data integrity checking at the data integrity process block 350 may include one or more of several checks. For example, the host node 302H may check that the response time from a network node (e.g., the network node 304) to the subsequent network node (e.g., the network node 306) is within an expected message time. The host node 302H may ensure that the full cycle time (i.e., the response from all nodes) is within the expected cycle time (e.g., 20 milliseconds). The host node 302H may ensure that the order of the node identification numbers matches the order it gleaned from the teach-in process. The host node 302H may ensure that the cyclic redundancy check of each message is correct and that the sequence number of the messages is in the right order. The host node 302H, via the data processing block 350, may further ensure that there are no critical faults in the network nodes. Where the number of consecutive cycles with faults exceeds the safety process time (e.g., 100 milliseconds), the host 302H may enter a "safe mode" and alert the CPU 360. In some embodiments, the host and network node faults may be self-correcting. The CPU 360 may be coupled to the host node 302H in series, or the host node 302H may convey information (e.g., the state of the network data or an alert) to the CPU 360 efficiently via any other method. The host node 302H may convey the information to the CPU 360 in the order it is received from the network nodes (e.g., the network nodes 304, 306) and thereby act as a SIL3 data router/concentrator with data and diagnostic information of the network 300.

Thus, as has been described, the communication systems 100 and 300 may eliminate the problems associated with high speed data transmission over long distances to many network nodes by daisy chaining the nodes and by employing a token passing scheme as a data trigger. The skilled artisan will appreciate that in certain settings, such as in high rise buildings and/or where the number of nodes is large, use of the communication system 300 may be preferable over the communication system 100. The communication system 300 may reduce the electrical load at each network node and may reduce the transmission length to the distance between successive nodes, and thereby, eliminate or at least significantly reduce the reflections on the transmission line 345 as compared to the transmission line 144B of the communication system 100. As such, the communication system 300 may allow for high speed transmission at greater distances and for a larger number of network nodes as compared to the system 100. The hoistway communication systems disclosed herein (e.g., the communication system 300) may provide a response time of under 20 milliseconds and a safety cycle time of under 100 milliseconds for critical electrical protective devices (e.g., final limit switches, pit stop switches, buffer switches, hoistway access run switches, hoistway door interlocks, et cetera) in the hoistway 14, and as noted, may be rated SIL3 as required by the American Society of Mechanical Engineers (ASME) A17.1.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A communication system for an elevator hoistway, comprising:
    a host node having a processor, a non-transitory computer memory, a host receiver, and a host output select line;
    a first network node having a first input select line, a first output select line, and a first tri-state transceiver; the first network node being coupled to the host node in series via the first input select line and the host output select line; and
    a second network node having a second input select line, a second output select line, and a second tri-state transceiver; the second node being coupled to the first node in series via the second input select line and the first output select line;
    wherein:
    the first tri-state transceiver is enabled when the first input select line is activated to receive a token from the host output select line; the first network node transmitting data to the host receiver upon receipt of the token;
    the second tri-state transceiver is enabled when the second input select line is activated to receive the token from the first output select line; and
    the system is operable in each of a teach-in mode, a normal mode, and a safe mode; the teach-in mode configured to teach the host node each of an identification number and a sequence of each of the first and second network nodes within a cycle time; the safe mode being activated when data is not received by the host node within a safety cycle time, the safety cycle time being divisible by the cycle time.

2. The communication system of claim 1 wherein the host node further comprises an input device and an output device.

3. The communication system of claim 2 wherein:
    the input device is utilizable to initiate a loopback test; and
    the host node further comprises a diagnostic input line coupled to the host output select line.

4. The communication system of claim 2 wherein the output device comprises a light emitting diode for conveying a status of the communication system.

5. The communication system of claim 4 wherein the first tri-state transceiver of the first node is external to the first node.

6. The communication system 1 wherein the first tri-state transceiver has associated therewith programming instructions to test for a stuck input.

7. The communication system of claim 6 wherein each data transmission from the first network node to the host node includes an identification number of the first network node.

8. A method for making a communication system for an elevator hoistway, the method comprising steps:
providing a host node having a host output select line and a host receiver;
providing a plurality of network nodes in the elevator hoistway, each network node having an input select line, an output select line, and a tri-state transceiver;
daisy chaining the host node and the plurality of network nodes;
causing the tri-state transceiver of one of the plurality of network nodes to be enabled when the input select line of that network node is activated by the output select line of the preceding node;
operating the system in a teach-in mode by causing the host node to receive an identification number and sequence of each of the plurality of nodes within a cycle time; and
activating a safe mode when data is not received by the host node within a safety cycle time, the safety cycle time being greater than the cycle time.

9. The method of claim 8 further comprising looping back an output of the host output select line to a host diagnostic input line.

10. The method of claim 8 further comprising associating with each tri-state transceiver logic to test for a stuck input.

11. The method of claim 10 further comprising equipping the host node with an output device; the output device conveying a status of the communication system to a user.

12. The method of claim 11 wherein the output device comprises a light emitting diode.

13. The method of claim 12 wherein the plurality of network nodes equals about 200 nodes.

14. A communication system, comprising:
a host node having a processor, a non-transitory computer memory, a host receiver, and a host output select line;
a plurality of network nodes, each network node having an input select line, an output select line, and a tri-state transceiver;
wherein the host node and the plurality of network nodes are daisy chained such that the input select line of one of the plurality of network nodes is coupled to the output select line of the preceding node;
wherein:
the tri-state transceiver of each of the plurality of network nodes is activated when the input select line of that node receives a token from the output select line of the preceding node;
the system is operable in each of a teach-in mode and a safe mode; the teach-in mode configured to teach the host node each of an identification number and a sequence of each of the plurality of network nodes within a cycle time; the safe mode being activated when data is not received by the host node within a safety cycle time that is divisible by the cycle time; and
each of the input select lines and the output select lines are dedicated lines.

15. The communication system of claim 14 wherein the host node further comprises an input device and an output device.

16. The communication system of claim 15 wherein the host node further comprises a diagnostic input line to monitor the host output select line.

17. The communication system of claim 16 wherein the host node is in data communication with an elevator controller.

* * * * *